United States Patent
Düppre

(10) Patent No.: US 8,134,090 B2
(45) Date of Patent: Mar. 13, 2012

(54) METHOD FOR WEIGHING WITH A NUMBER OF WEIGHING CELLS

(75) Inventor: Theo Düppre, Kaiserlautern (DE)

(73) Assignee: Wipotec Wiege-und Positioniersysteme GmbH, Kaiserslautern (DE)

(*) Notice: Subject to any disclaimer, the term of this patent is extended or adjusted under 35 U.S.C. 154(b) by 267 days.

(21) Appl. No.: 12/094,396

(22) PCT Filed: Nov. 20, 2006

(86) PCT No.: PCT/DE2006/002037
§ 371 (c)(1),
(2), (4) Date: Sep. 9, 2008

(87) PCT Pub. No.: WO2007/057001
PCT Pub. Date: May 24, 2007

(65) Prior Publication Data
US 2009/0032311 A1    Feb. 5, 2009

(30) Foreign Application Priority Data
Nov. 21, 2005   (DE) .................. 10 2005 055 755

(51) Int. Cl.
*G01G 11/00* (2006.01)
(52) U.S. Cl. ......... 177/119; 177/145; 177/199; 177/200
(58) Field of Classification Search .................. 177/119, 177/145, 200, 199
See application file for complete search history.

(56) References Cited

U.S. PATENT DOCUMENTS

| | | | | |
|---|---|---|---|---|
| 3,533,481 A * | 10/1970 | Paelian | .................. | 177/134 |
| 3,593,263 A * | 7/1971 | Olsen | .................. | 340/935 |
| 4,815,547 A * | 3/1989 | Dillon et al. | .................. | 177/25.14 |
| 4,868,951 A | 9/1989 | Akesson et al. | | |
| 5,230,391 A * | 7/1993 | Murata et al. | .................. | 177/50 |
| 5,326,938 A * | 7/1994 | Tolson | .................. | 177/5 |
| 5,338,901 A * | 8/1994 | Dietrich | .................. | 177/16 |
| 5,596,179 A * | 1/1997 | Sakaeda | .................. | 177/25.18 |
| 5,990,422 A * | 11/1999 | Komori et al. | .................. | 177/25.11 |
| 6,433,288 B1 * | 8/2002 | Olafsson | .................. | 177/145 |
| 6,552,278 B2 * | 4/2003 | Johnson | .................. | 177/134 |
| 7,279,645 B1 * | 10/2007 | Inglin et al. | .................. | 177/145 |

FOREIGN PATENT DOCUMENTS

| | | |
|---|---|---|
| EP | 0 252 245 A1 | 1/1988 |
| JP | 06-018318 | 1/1994 |
| JP | 2000-249591 | 9/2000 |

OTHER PUBLICATIONS

JPO, Notification of Reason for Refusal issued Mar. 14, 2011 in corresponding Japanese Patent Application No. 2008-541584 (partial English translation) (5 pages).

* cited by examiner

*Primary Examiner* — Randy W Gibson
(74) *Attorney, Agent, or Firm* — The Culbertson Group, P.C.

(57) ABSTRACT

The invention pertains to a method for weighing at least one object (31) that can be or is moved relative to a number of weighing cells (3, 5, 7, 9) and to a device for effecting said method, wherein the weighing cells (3, 5, 7, 9) essentially are adjacently arranged transverse to the movement direction (T) and the weighing signals being generated while weighing at least one object (31) are coupled with one another.

8 Claims, 1 Drawing Sheet

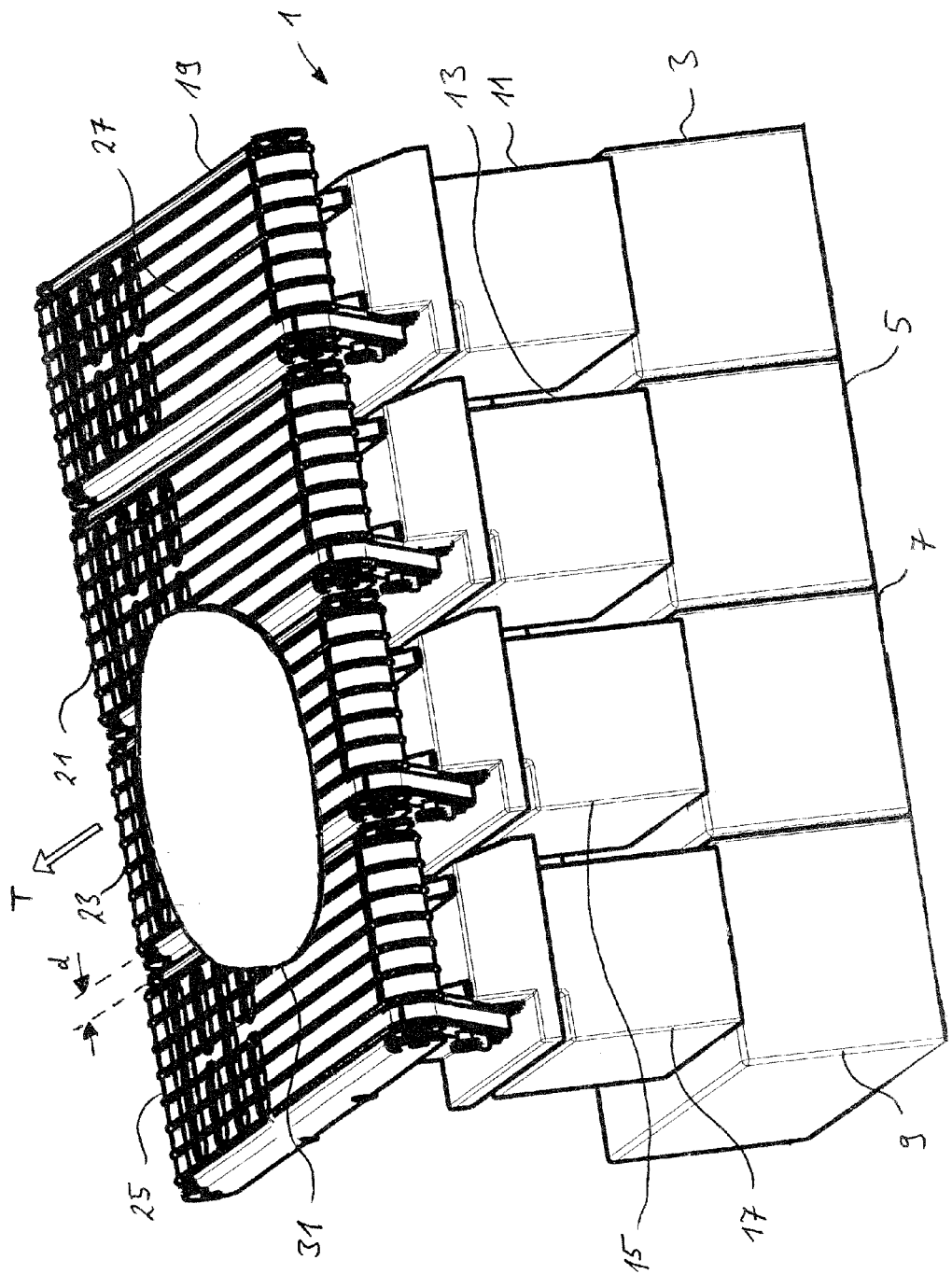

METHOD FOR WEIGHING WITH A NUMBER OF WEIGHING CELLS

TECHNICAL FIELD OF THE INVENTION

The invention pertains to a weighing method for weighing variably sized objects which are movable along a transport path and to a device for carrying out this method.

BACKGROUND OF THE INVENTION

Methods and devices for weighing variably sized objects which are transported for processing along a transport path are used, for example, in the food industry. For example, products such as sausage and cheese are sliced, automatically weighed and packaged on fully automated production lines (so-called slicers). In order to weigh slices of different diameters, scales (with so-called weighing cells) are provided with transport devices of different widths, e.g., thin, medium and thick. This means that production lines of this type are specifically adapted to the respective product diameter. This is associated with high costs because at least the transport system or the complete weighing device needs to be exchanged in conventional weighing devices, or in production lines for weighing products of different widths that are equipped with such weighing devices. Alternatively, a number of production lines with scales and transport systems of different widths need to be provided.

SUMMARY OF THE INVENTION

The present invention addresses the problem of weighing objects with different dimensions as such objects are transported along a transport path, and has the objective of eliminating above-described disadvantages.

A weighing device according to the present invention includes a number of weighing cells arranged parallel to one another along a line extending essentially transverse to the transport direction of a movable or moving object to be automatically weighed. The different weighing cells may be aligned with one another along the line extending transverse to the transport direction, or may be slightly offset with one another along the line. Since it is possible to couple the weighing signals of the weighing cells as necessary, it is advantageously possible to also weigh objects that lie on two or more weighing cells or their weighing supports (for supporting the object to be weighed) due to their dimensions, namely without having to provide a different weighing device or to adapt an existing weighing device to such objects.

In one preferred embodiment of the invention, a selection of the signals being generated by the respectively active weighing cells is made for the coupling process as a function of the size and position of an object. For example, two or more adjacent weighing cells or their output signals can be respectively coupled in order to correctly weigh an object that extends over several adjacent weighing cells or their preferably aligned (relative to the surface) weighing supports or weighing platforms due to their size. However, not all output signals are coupled during each weighing process, such that it is advantageously possible to simultaneously (separately) weigh two objects. It should be noted here that the following description will refer generally only to "weighing cells" in order to simplify the discussion. However, it is to be understood that the designation "weighing cell" as used in this disclosure and the accompanying claims is intended to encompass both an independent weighing cell that is not rigidly coupled mechanically and/or by signaling means to any other weighing cell, and a weighing module that includes, for example, several non-independent weighing cells.

In another embodiment of the invention, the selection can be made manually or automatically by means of a switch that can be realized in the form of a manual switch such as, for example, a rotary switch or an electronic circuit (including circuits realized with the aid of software). Instead of a manual selection, it would also be possible to carry out the selection automatically, wherein the size and position of the object to be weighed are detected by means of a sensor device and the corresponding weighing cells or their signals are coupled, for example, by actuating the selection switch accordingly. There are a number of optical, mechanical or electronic ways to realize the sensor device, for example, as a photosensor between adjacent weighing cells or their weighing supports, as an image capture by means of a camera and a corresponding evaluation device, or as an electromechanical detection by means of contacts, actuating elements, etc. Naturally, it would also be conceivable to realize the sensor device in the form of an evaluation of the respective weighing signals or weight signals (in this case, "weighing signal present" means, for example, that the respective weighing cell actively weighs an object and that several signals need to be coupled with one another, if applicable). The sensor device may also directly form part of the weighing device in this case. The selection may furthermore be realized automatically or manually, for example, as a function of the dataset of a product data memory that is associated with the product to be weighed.

Since the size of an object to be weighed is directly dependent on the size of the object prior to any processing thereof, it would also be conceivable to arrange the sensor device on a processing machine that is situated upstream of the weighing device in the production line and the production process, rather than directly on the weighing cell or a weighing support that is mechanically coupled thereto and is possibly realized in the form of a transport device. In a production line for slicing, weighing and packaging an object, it would therefore be conceivable to arrange the sensor device on a slicing machine that is situated upstream of the weighing device relative to the processing sequence, for example, directly on an adjustable holder for the object to be sliced, in order to have already determined the subsequent position and size of the sliced products, for example, sausage slices, on the weighing device or transport device coupled thereto prior to the actual weighing process.

In one preferred embodiment, the weighing signals or the selected weighing signals are coupled by means of an evaluation device. In this case, the evaluation device may be arranged externally or may directly form part of the weighing device, particularly the weighing cell or the electronics contained therein. The coupling of the signals can be realized with suitable calculation methods such as adding, integrating, etc., of the analog or digital signals prior or subsequent to their further processing in order to obtain a correct result.

These and other advantages and features of the invention will be apparent from the following description of the preferred embodiments, considered along with the accompanying drawings.

BRIEF DESCRIPTION OF THE DRAWINGS

The invention is described in greater detail below with reference to one embodiment that is illustrated in the drawing.

The drawing shows a schematic oblique representation of an example weighing device embodying principles of the invention.

DESCRIPTION OF ILLUSTRATIVE EMBODIMENTS.

The weighing device 1 illustrated in the drawing features a number of independent weighing cells 3, 5, 7 and 9, i.e., weighing cells that are not rigidly coupled to one another (and, in particular, feature weighing supports that are not directly coupled to one another mechanically), wherein said weighing cells are realized, for example, in the form of weighing modules with corresponding electronics for outputting an analog or digital weighing signal. The respective weighing cells 3, 5, 7 and 9 are mechanically coupled to weighing supports (or weighing platforms) realized in the form of transport devices 11, 13, 15 and 17 that feature conveying means 19, 21, 23, 25 with belts, chains, straps, bands or the like that are preferably driven synchronously in the transport direction T by means of rollers. According to the drawing, the weighing cells 3, 5, 7, 9 are arranged adjacent to one another in the form of a row, such that they extend transverse to the transport direction and preferably form an aligned surface to each other.

If an object 31 to be weighed, such as a sausage slice, for example, has larger dimensions than the lateral dimensions of the transport devices 11, 13, 15 and 17, the object 31 lies not just on one of the transport devices 11, 13, 15, 17 arranged above the weighing cells 3, 5, 7, 9, but rather on a number of transport devices such as, for example, on the conveyor belts 21, 23 and 25—as illustrated in the example—and is transported thereon in the direction T. In order to correctly weigh the object 31 during its transport, the output signals of the weighing cells 5, 7, 9 assigned to the conveyor belts 21, 23, 25 are coupled by means of a switch (for example, an electronic circuit or a mechanical switch).

In order to prevent errors due to unfavorable positions of the object 31, the distance d between adjacent weighing supports, which in the embodiment shown are realized in the form of transport supports 19, 21, 23, 25, can be made small in comparison with the width of a weighing support (for example, in the range of a few cm or a few mm) in order to prevent the object 31 from lying on the lateral transitions and therefore leading to a faulty weighing process. The conveying means 27, for example in the form of belts, chains, straps or the like, may lie slightly higher than the remaining parts of the transport supports 19, 21, 23, 25 so that the object 31 is, in this way, also prevented from lying on the lateral transitions.

The weighing device 1 illustrated in the drawing makes it possible to correctly weigh small objects that only lie, for example, on one of the individual transport devices 19, 21, 23 or 25, as well as medium-sized and large objects that lie or are transported, for example, on two, three or even four transport devices, as in the embodiment shown.

The required respective coupling of the output signals of the weighing cells 3, 5, 7, 9 or a selection thereof may also be realized automatically with the aid of a sensor device. In this case, the sensor device may accordingly control a switch that is realized, for example, in the form of an electronic circuit (including circuits realized by means of software).

Such a sensor device may be realized, for example, in the form of a photosensor that detects whether or not the respective gap or distance d between adjacent transport supports 19, 21, 23, 25 is covered. Naturally, it would also be conceivable to detect an object 31 to be weighed, and therefore its position, by means of a camera and a corresponding evaluation (image acquisition). It would also be conceivable to correspondingly evaluate the respective weighing signals and to couple the respective weighing cells as a function of the presence of a minimum signal.

Furthermore, the sensor device may also be arranged in a production line upstream of the weighing device 1 such as, for example, a slicing device, wherein it would even be conceivable to detect the object or its dimensions prior to the slicing process, for example, in a holder, and thus to determine the dimensions of the sliced object, such as a sausage slice, for example, and its subsequent position on the transport device 19, 21, 23, 25.

Naturally, the inventive method and the inventive device are not limited to the illustrated embodiment only, but can also be used for any objects to be weighed that can be or are moved relative to a weighing device and automatically weighed during movement (continuously) or between movements (start-stop mode). For example, the inventive method and the inventive device are not only suitable for transporting and weighing objects in the food industry, such as sausage, cheese, bread slices, etc., for example, but also for transporting and weighing large quantities of objects of any size, for example, screws, bolts, boxes, letters, etc.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method for weighing at least one object that is movable along a transport path in a direction of movement, the method including:
    (a) arranging a number of essentially adjacent, respectively active independent weighing cells along a weighing cell line which crosses the transport path in a direction transverse to the direction of movement, each respective weighing cell being mechanically coupled to a respective transport device which is adapted to transport at least a portion of the at least one object along the transport path, and each respective weighing cell generating a respective weighing signal in response to weighing the at least one object while such object is at least partially supported by the transport device coupled to that respective weighing cell;
    (b) selecting respective weighing signals for coupling as a function of the size of the object, or the position of the object, or both the size of the object and the position of the object; and
    (c) coupling two or more of the respective weighing signals.

2. The method of claim 1 wherein the respective weighing signals are coupled by means of an evaluation device.

3. The method of claim 1 wherein selecting respective weighing signals is performed automatically by means of a sensor device.

4. The method of claim 3 wherein the respective weighing signals are coupled by means of an evaluation device.

5. The method according to claim 1, 2, 3, or 4 wherein the coupling includes adding or integrating the respective weighing signals.

6. A weighing device for weighing at least one object that is movable along a transport path in a direction of movement, the weighing device including:
 (a) a number of essentially adjacent, respectively active independent weighing cells arranged in a weighing cell line, the weighing cell line crossing the transport path transverse to the direction of movement, each respective weighing cell generating a respective weighing signal in response to weighing the at least one object;
 (b) a respective transport device for each respective weighing cell, the respective transport device for a respective weighing cell being adapted to transport at least a portion of the at least one object along the transport path and being mechanically coupled to the respective weighing cell such that weighing the at least one object by the respective weighing cell is accomplished while the at least one object is at least partially supported by the transport device for that respective weighing cell;
 (c) wherein two or more of the respective weighing signals are coupled together; and
 (d) wherein selecting respective weighing signals for coupling is performed as a function of the size of the object, or the position of the object, or both the size of the object and the position of the object.

7. The weighing device of claim 6 wherein the respective weighing signals to be coupled are selected automatically.

8. The weighing device according to claims 6 or 7 wherein the respective weighing signals are coupled by means of an evaluation device.

* * * * *